United States Patent
Cerrone et al.

(10) Patent No.: US 6,782,418 B1
(45) Date of Patent: Aug. 24, 2004

(54) METHOD AND APPARATUS FOR SECURE DATA FILE UPLOADING

(75) Inventors: David Francis Cerrone, Troy, NY (US); David Anthony Czarnecki, Clifton Park, NY (US); Barbara Jean Vivier, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/490,142

(22) Filed: Jan. 24, 2000

(51) Int. Cl.[7] .............................................. G06F 15/16
(52) U.S. Cl. ...................................................... 709/217
(58) Field of Search ............................... 709/201, 217, 709/220, 223, 227

(56) References Cited

U.S. PATENT DOCUMENTS

| | | | |
|---|---|---|---|
| 5,625,818 A | * 4/1997 | Zarmer et al. | 707/104.1 |
| 5,740,231 A | * 4/1998 | Cohen et al. | 379/88.22 |
| 6,345,294 B1 | * 2/2002 | O'Toole et al. | 709/222 |
| 6,393,425 B1 | * 5/2002 | Kelly | 707/100 |
| 6,401,103 B1 | * 6/2002 | Ho et al. | 707/201 |
| 6,412,009 B1 | * 6/2002 | Erickson et al. | 709/228 |
| 6,493,677 B1 | * 12/2002 | Rosen et al. | 705/27 |

* cited by examiner

Primary Examiner—David Y. Eng
(74) Attorney, Agent, or Firm—Patrick K. Patnode

(57) ABSTRACT

Disclosed is a distributed computer application that utilizes the Internet and Web browsers as the interface to the distributed computer application server. Users who are providers of data utilize Secure Sockets Layer (SSL) enabled HyperText Transport Protocol (HTTP) to encrypt communications between their Web browser and the distributed computer application Web server (HTTPS). A Java servlet on the external HTTPS distributed computer application Web server handles the file upload from the Web browser and re-POSTs the data to a processing Java servlet on an internal HTTPS distributed computer application application server. The processing Java servlet on the internal HTTPS distributed computer application server is used to handle the file upload from the collection Java servlet on the external HTTPS distributed computer application Web server and saves the file locally in a database on the internal HTTPS distributed computer application application server.

7 Claims, 4 Drawing Sheets

METHOD AND APPARATUS FOR SECURE
DATA FILE UPLOADING

FIELD OF THE INVENTION

This invention relates to distributed computing and, more particularly, to a secure data file uploading system for a distributed computer application utilizing the Internet and a Web browser as the user interface to the distributed computer application.

BACKGROUND OF THE INVENTION

Distributed computing allows members of a user community to share data. Distributed computing relies on the use of multiple computers in a distributed computer network rather than one centralized system. For example, large organizations have computers dedicated to departmental use. In a distributed computer network these computers are networked together and are not just decentralized systems without any communications between them. In addition, client/server applications tend to disburse more and more computers throughout the organization.

Some users of the community are providers of data and some users are consumers. In certain application domains, such as healthcare, providers of data require a secure user agent to upload data into the distributed computer application. If the distributed computer network relies upon the Internet for communication between users, data security becomes an important issue. With the growth of the Internet, distributed computer networks are more and more likely to use a Web browser as their user agent of choice for data file uploading from their data providers due to the user-friendly features that more and more people are accustomed to in using Web browsers and the Internet. However, it has been difficult to provide the security necessary for distributed computer applications that wish to use Web browsers and the Internet as the user interface. This is due in part to the unsecured circuitous route taken by data transmitted over the Internet and the possibility of unauthorized access of the data during transmission. In addition, in order to make such distributed computer applications affordable, there are often resource constraints that limit the use of server technology to simpler systems that are incompatible with the high security that is both desired and necessary in some cases. Finally, distributed computer networks that require a lot of effort to set up and maintain have proven to be very undesirable and not cost effective.

SUMMARY OF THE INVENTION

It is therefore desirable to securely move data files from a remote site to a distributed computer application server using a Web browser and the Internet, an intranet, or other network with standard communication protocols and to protect the distributed computer application server from any direct Internet, intranet, or other network connections. It is also desirable to use one process in a Web server that is exposed to the Internet, intranet, or other external network that will collect the data and pass the data securely through a firewall and a router to a second process in the distributed computer application server that processes the data and is protected from the Internet, intranet, or other external network.

The present invention is a distributed computer application that utilizes the Internet and Web browsers as the interface to the distributed computer application. Users who are providers of data utilize Secure Sockets Layer (SSL) enabled HyperText Transport Protocol (HTTP), referred to as HTTPS (HTTP with SSL), to encrypt communications between their Web browser and the distributed computer application server. SSL is a leading security protocol on the Internet and provides server authentication and optionally user authentication. HTTP is a communications protocol used to connect servers on the World Wide Web. Its primary function is to establish a connection with the Web server and transmit HTML pages to the client Web browser.

The HTTPS capability is used to upload data files and handle the data file transfer from the Web browser to the external HTTP distributed computer application Web server. A collection Java servlet on the external HTTP distributed computer application Web server handles the data file upload from the Web browser, checks for required form elements, adds, the Internet Protocol (IP) address of the computer running the Web browser software to the form elements, re-POSTs the data to a processing Java servlet on an internal HTTP distributed computer application WEB server, records the response of the processing Java servlet on the internal HTTP distributed computer application WEB server, and returns the response to the initiating Web browser.

The processing Java servlet on the internal HTTP distributed computer application WEB server is used to handle the data file upload from the processing Java servlet on the external HTTP distributed computer application Web server, checks for required form elements, checks that the identity for the POST is valid, saves the data file locally on the internal HTTP distributed computer application WEB server, and returns a response to the collection Java servlet.

When an HTTPS session is started, the Web browser sends its public key to the Web server so that the Web server can securely send a secret key to the Web browser. The Web browser and Web server exchange data via secret key encryption during that session. Using HTTPS in the Uniform Resource Locator (URL) instead of HTTP directs the message to a secure port number rather than the default Web port number of 80. The session is then managed by a security protocol. The security protocol is a communications protocol that encrypts and decrypts the message for on-line transmission. The security protocol can also provide user authentication.

DETAILED DESCRIPTION

Figure 1:
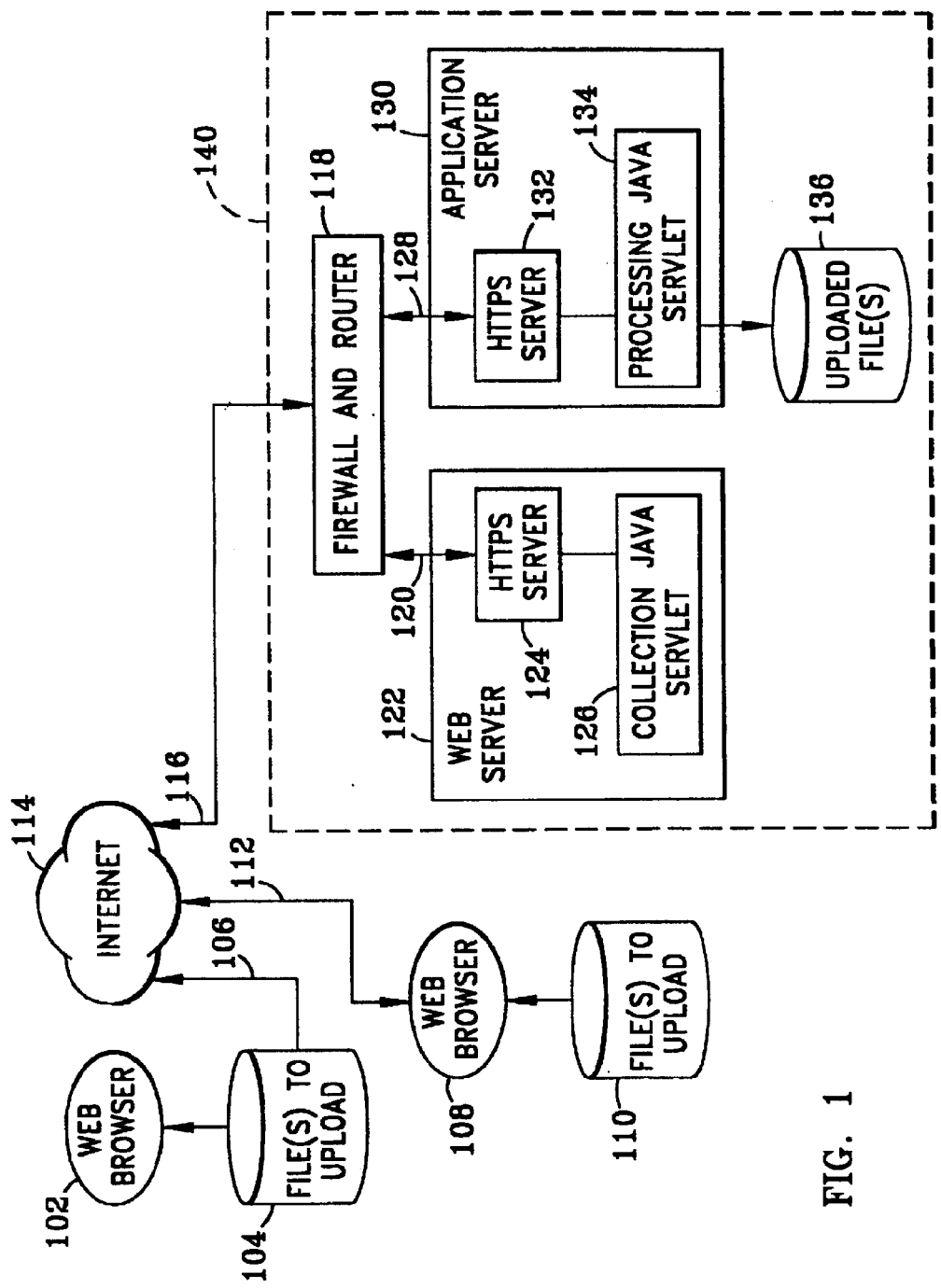
FIG. 1 shows an embodiment of the present invention where files are uploaded from a Web browser over the Internet to an application server.

FIG. 1 shows an embodiment of the present invention where files are uploaded from a Web browser over the Internet 114 to an application server. Referring now to FIG. 1, Web browser 102 and Web browser 108 are connected to the Internet 114 through Internet connection 106 and Internet connection 112 respectively. Internet 114 may also be an intranet or some other type of computer network.

Web browser 102 has access to storage device 104 which contains one or more files to be uploaded. Web browser 108 has access to storage device 110 which also contains one or more files to be uploaded. One skilled in the art will recognize that many Web browsers could be connected to the Internet 114, but only Web browser 102 and Web browser 108 are shown for simplicity.

Distributed computer application 140 is also connected to the Internet 114 through Internet connection 116. Distributed computer application 140 has a firewall 118 and router 118 that handles all traffic transmitted over Internet connection 116 from Internet 114. Web server 122 and application server 130 are connected to firewall 118 and router 118 through connection 120 and connection 128 respectively. Distributed computer application 140 could be directed to one of many different kinds of business, educational, charitable, or scientific endeavors. In one embodiment of the invention, distributed computer application 140 is directed to the healthcare industry where a secure framework for uploading patient/referral/member data into the application is needed. Users gather the patient/referral/member data and upload it to distributed computer application 140 using Web browser 102 or 108 where it is then added to the application database. Users may also access the data contained in the database from their Web browsers.

Web server 122 has HTTP server 124 and collection Java servlet 126. Application server 130 has HTTP server 132 and processing Java servlet 134.

Figure 2:
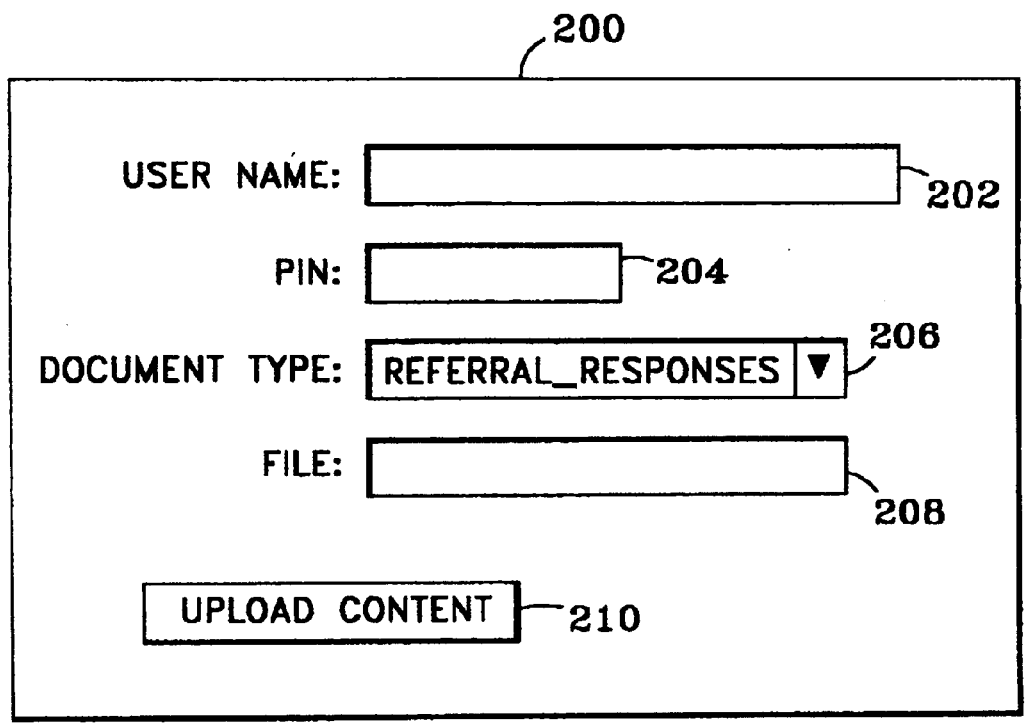
FIG. 2 shows an HTML page that is displayed on a Web browser for uploading data files to a distributed computer application in an embodiment of the present invention.

Web browser 102 is loaded on a computer workstation, such as a personal computer, or made available to a user from a terminal (not shown in FIG. 1). One skilled in the art will recognize that other user agents besides Web browser 102 could be used. The user at the computer workstation or terminal is a provider of data for distributed computer application 140. Using Web browser 102, the user makes a request from Web browser 102 to distributed computer application 140 to load the HTML page 200 for the purpose of uploading one or more data files to distributed computer application 140. HTTP server 124 within Web server 122 receives the request and returns the HTML page 200 to Web browser 102 which is then displayed within Web browser 102. Distributed computer application 140 may require a login procedure which is well known in the art. From Web browser 102, the user selects an option to upload a data file to distributed computer application 140. The user may upload a data file from within an HTML page as shown in FIG. 2.

After the user selects the command to upload the data file, the request to upload the data file is sent from Web browser 102 to distributed computer application 140. This request is received in HTTP server 124 which invokes collection Java servlet 126. If collection Java servlet 126 has not already been loaded, it will be loaded at this time. Normally, collection Java servlet 126 is loaded only once. Thereafter, multiple threads of collection Java servlet 126 will handle multiple client requests.

Collection Java servlet 126 handles the data file upload from Web browser 102. The data file is transmitted in a secure fashion by utilizing SSL. SSL sits on top of all socket communications. SSL encrypts all the data before the data are transmitted from Web browser 102 over the Internet 114, and decrypts the data once the data reach Web server 122. Web server 122 is configured to enable the use of SSL and is equipped with a digital certificate. Optionally, Web browser 102 may also be equipped with a digital certificate to allow for user authentication. Collection Java servlet 126 also checks for required form elements and adds the IP address of the computer running Web browser 102 to the form elements. The data file is then re-POST-ed by collection Java servlet 126 to processing Java servlet 134. If processing Java servlet 134 is not yet loaded, it will be loaded at this time as described above in the discussion of collection Java servlet 126.

Processing Java servlet 134 handles the data file upload from collection Java servlet 126. Processing Java servlet 134 checks for the required form elements, and checks if the identity for the POST is valid. If valid, processing Java servlet 134 then saves the data file on storage device 136 connected to application server 130. All the uploaded files are then made available to other users who have access to distributed computer application 140.

FIG. 2 shows an HTML page that is displayed on a Web browser for uploading data files to a distributed computer application in an embodiment of the present invention. Referring now to FIG. 2, HTML page 200 is displayed on Web browser 102 or Web browser 108 after a user has requested distributed computer application 140 and the upload option. Only authorized users may upload data. Users are authorized by making an entry in a configuration file within HTTP server 124. Various form elements are presented in HTML page 200 to be entered by the user.

The user enters the user's login name in user name field 202. The user enters their PIN number in PIN number field 204. The user may select a drop-down menu in document type field 206 to choose the type of document to be uploaded, such as a referral response data file, a patient data file, or a member data file. The user may enter the data file name to be uploaded in file name field 208 or click on a browse button (not shown in FIG. 2) and select the data file to be uploaded, which will then appear in file name field 208. The user then clicks on upload content button 210, which sends input initiating the data file upload process more fully described below in the discussion of FIGS. 3A and 3B.

Figure 3A:
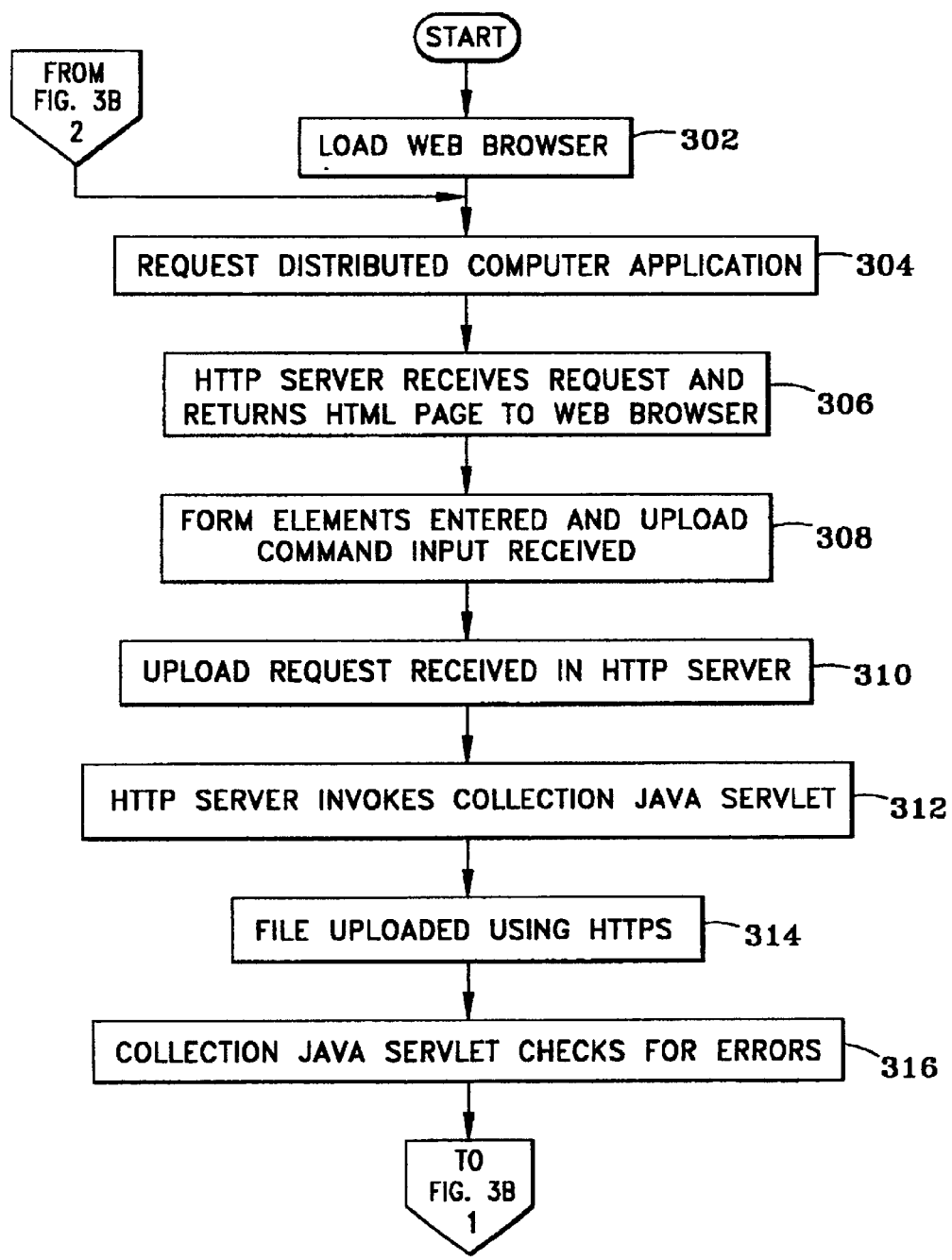
FIGS. 3A and 3B show a block diagram of the overall process of uploading a data file from a Web browser over the Internet to an application server in an embodiment of the present invention.
Figure 3B:
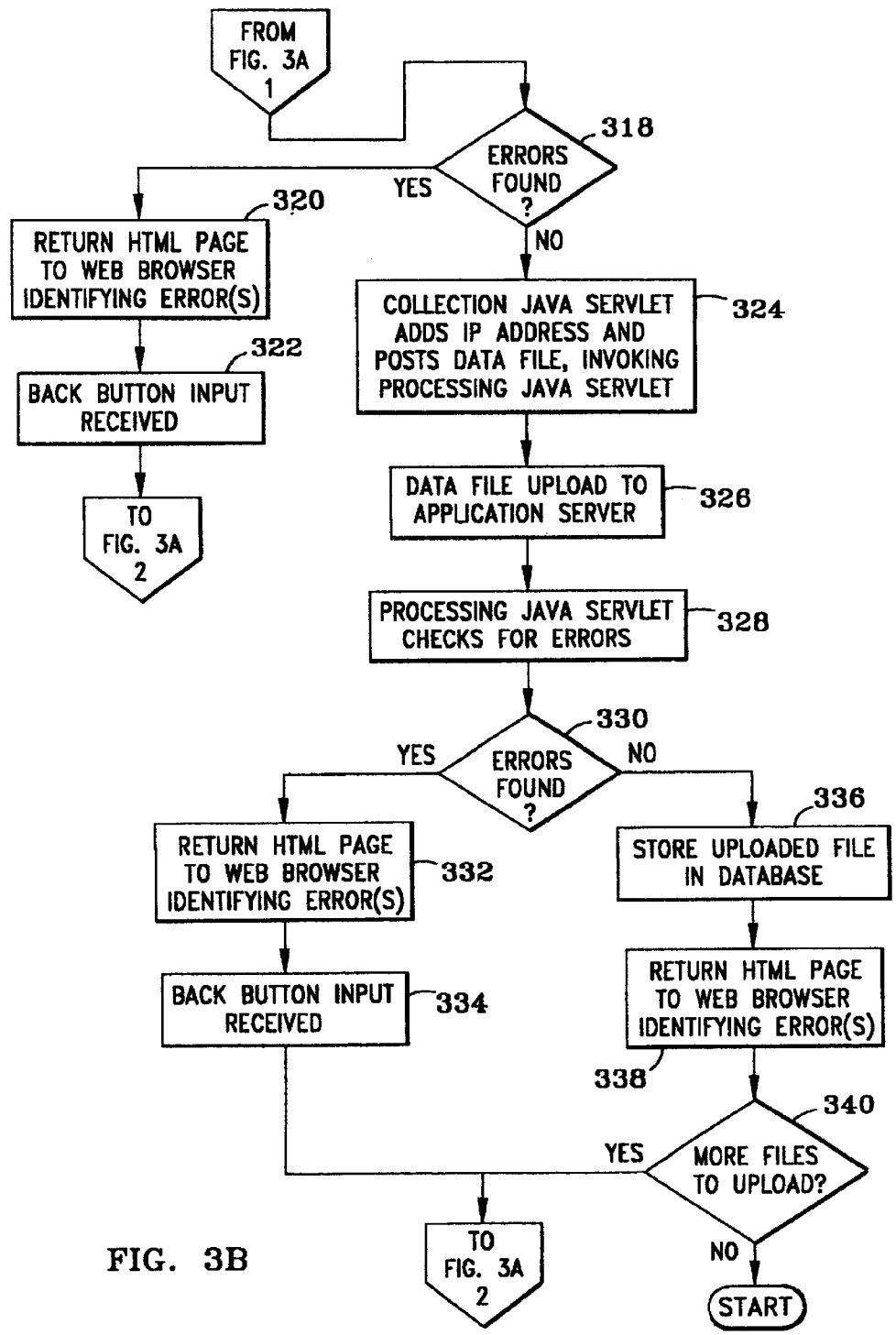

FIGS. 3A and 3B show a block diagram of the overall process of uploading a data file from a Web browser over the Internet 114 to an application server (130 in an embodiment of the present invention. Referring now to FIG. 3A, in step 302 Web browser 102 or Web browser 108 (FIG. 1) is loaded on a computer workstation, such as a personal computer, or made available to a user from a terminal. For the purposes of discussion in this FIG. 3, it is assumed that Web browser 102 is loaded. In step 304 input is received in Web browser 102 requesting distributed computer application 140 (FIG. 1). In step 306 HTTP server 124 in Web server 122 (FIG. 1) receives the request, and returns HTML page 200 (FIG. 2) to Web browser 102, which is then displayed within Web browser 102.

In step 308 input is received in the form elements in HTML page 200 and input is received from selecting upload content button 210 (FIG. 2) for the upload command. HTTP server 124 receives the upload request in step 310. HTTP server 124 invokes the collection Java servlet 126 (FIG. 1) in step 312 if it has not already been loaded.

In step 314 collection Java servlet 126 handles the HTTPS enabled data file upload from Web browser 102. In step 316 collection Java servlet 126 checks for errors in the data received. Examples of errors include no data in the data file uploaded, or no data in a form element. Referring now to FIG. 3B, step 318 determines if any errors were found in step 316. If errors were found, then in step 320 collection Java servlet 126 returns an HTML page to Web browser 102 identifying the errors found. Back button input from Web browser 102 is received in step 322. Control then returns to step 306 of FIG. 3A where HTTP server 124 receives the back button request and returns HTML page 200 for redisplay on Web browser 102, allowing the user to correct the incorrect entries.

If step 318 determines that no errors were found in step 316, then in step 324 collection Java servlet 126 adds the EP address of the computer running Web browser 102 to the form elements and re-POSTs the data file to processing Java servlet 134 (FIG. 1). If processing Java servlet 134 has not yet been invoked, it is loaded at this time.

In step 326, processing Java servlet 134 handles the data file upload from Web server 122 to application server 130 (FIG. 1). Processing Java servlet 134 checks for errors in the data received in step 328 and verifies that the identity for the POST is valid. Examples of errors include an invalid user login name or invalid PIN number.

Step 330 determines if any errors were found in step 328. If errors were found, then in step 332 processing Java servlet 126 returns an HTML page 200 to Web browser 102 identifying the errors found. Back button input from Web browser 102 is received in step 334. Control then returns to step 306 of FIG. 3A where HTTP server 124 receives the back button request and returns HTML page 200 for redisplay on Web browser 102, allowing the user to correct the incorrect entries.

If step 330 determines that no errors were found in step 328, then in step 336 processing Java servlet 134 stores the uploaded data file in the application database in storage device 136 (FIG. 1) connected to application server 130. Processing Java servlet 134 in step 338 returns an HTML page 200 to Web browser 102 verifying that the data file was successfully uploaded.

In step 340, if there are more data files to upload, control returns to step 306 of FIG. 3A. If there are no more data files to upload in step 340, then the data file uploading process ends.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for securely uploading a data file from a first computer to a distributed computer application operating within a distributed computing network in which the distributed computing network comprises an application server, having a memory and a database, and capable of running a network operating system and the distributed computer application, a firewall, a router, a network server capable of communicating with the application server using the router, and the first computer is capable of communicating with the network server over the distributed computing network through the firewall and the router using browser software loaded on the first computer, said method comprising the steps of:

(a) uploading the data file from the first computer using the browser software over the distributed computing network, through the firewall and the router, and to the network server;

(b) processing the data file in a first processing program loaded in the network server, wherein said first processing program handles the uploading of the data file from the first computer to the network server;

(c) uploading the data file from the network server to the application server;

(d) processing the data file in a second processing program loaded in the application server, wherein said second processing program handles the uploading of the data file from the network server to the application server;

(e) storing the data file in the database in the memory within the application server;

wherein step (a) further comprises uploading the data file from the first computer using Web browser software and HTTPS over the Internet and through the firewall and the router to a first HTTPS server within said network server having a Window NT operating system; step (b) further comprises processing the data file in a first Java servlet loaded in said network server; checking the data file uploaded from the first computer for a plurality of required form elements; adding an IP address of the first computer having the Web browser software to said plurality of required form elements; posting the data file uploaded from the first computer to said second Java servlet; and step (d) further comprises processing the data file in a second Java servlet loaded in the application server having a second HTTPS server.

2. The method according to claim 1 further comprising the following steps performed before said uploading step (a):

loading said Web browser software on the first computer;

requesting an HTML page from the distributed computer application with said Web browser software loaded on the first computer;

displaying said HTML page with said Web browser software loaded on the first computer;

entering a user name in a user name field in said HTML page;

entering a PIN number in a PIN number field in said HTML page;

entering a document type in a document type field in said HTML page;

entering a file name in a file name field in said HTML page;

selecting an upload content button in said HTML page sending an upload request;

receiving said upload request in said first HTTPS server; and invoking said first Java servlet by said first HTTPS server.

3. The method according to claim 1 wherein said checking step further comprises sending an error message to said Web browser software on the first computer when an error is detected in one of said plurality of required form elements.

4. The method according to claim 1 wherein said processing step (d) further comprises the steps of:

checking the data file uploaded from the network server for said plurality of required form elements;

verifying that an identity for said posting of the data file uploaded from said network server is valid;

returning a response to said first Java servlet;

recording said response of said second Java servlet in said first Java servlet; and returning said response recorded in said first Java servlet to said Web browser software loaded on the first computer.

5. The method according to claim 4 wherein said checking step further comprises sending an error message to said Web browser software on the first computer when an error is detected in one of said plurality of required form elements or when an identity for said posting of the data file uploaded from said network server is invalid.

6. The method according to claim 1 further comprising the step of:

(f) repeating steps (a) through (e) for uploading a second data file from the first computer to the distributed computer application.

7. The method according to claim 1 further comprising the step of:

(f) repeating steps (a) through (e) for uploading a second data file from a second computer to the distributed computer application, wherein said second computer is capable of communicating over the distributed computing network with the network server through the firewall and the router using the browser software loaded onto said second computer.

* * * * *

UNITED STATES PATENT AND TRADEMARK OFFICE
CERTIFICATE OF CORRECTION

PATENT NO. : 6,782,418 B1
DATED : August 24, 2004
INVENTOR(S) : David F. Cerrone et al.

Page 1 of 1

It is certified that error appears in the above-identified patent and that said Letters Patent is hereby corrected as shown below:

<u>Column 1,</u>
Line 3, after the title please insert

-- STATEMENT REGARDING FEDERALLY SPONSORED RESEARCH AND DEVELOPMENT

The U.S. Government may have certain rights in this invention pursuant to contract number 70NANB5H1011 awarded by the National Institute of Standards and Technology. --

Signed and Sealed this

Twenty-eighth Day of December, 2004

JON W. DUDAS
*Director of the United States Patent and Trademark Office*